US006748458B2

(12) United States Patent
Andrewartha et al.

(10) Patent No.: US 6,748,458 B2
(45) Date of Patent: Jun. 8, 2004

(54) MODULAR INPUT/OUTPUT EXPANSION SYSTEM FOR AN EXTERNAL COMPUTER

(75) Inventors: J. Michael Andrewartha, Plano, TX (US); Martha G. Peterson, McKinney, TX (US); Farrukh S. Syed, McKinney, TX (US); Brent A. Boudreaux, Highland Village, TX (US); Richard A. Schumacher, Dallas, TX (US); Bryan Wayne Pogor, Dallas, TX (US); Eric C. Peterson, McKinney, TX (US); Lee Thomas VanLanen, Garland, TX (US); Patrick Wesley Clark, McKinney, TX (US); Michael Jay Zalta, Richardson, TX (US); Scott Stuart Smith, Richardson, TX (US); Kirankumar Chhaganlal Patel, Plano, TX (US)

(73) Assignee: Hewlett Packard Development Company, L.P., Houston, TX (US)

( * ) Notice: Subject to any disclaimer, the term of this patent is extended or adjusted under 35 U.S.C. 154(b) by 268 days.

(21) Appl. No.: 09/944,529

(22) Filed: Aug. 31, 2001

(65) Prior Publication Data

US 2003/0046452 A1 Mar. 6, 2003

(51) Int. Cl.⁷ .............................................. G06F 13/14
(52) U.S. Cl. ............................ 710/2; 710/300; 710/305
(58) Field of Search .......................... 710/2, 300, 305, 710/311, 312, 313

(56) References Cited

U.S. PATENT DOCUMENTS

| | | | | |
|---|---|---|---|---|
| 5,696,949 A | * | 12/1997 | Young | 395/551 |
| 5,764,924 A | * | 6/1998 | Hong | 395/281 |
| 5,781,747 A | * | 7/1998 | Smith et al. | 395/305 |
| 6,070,214 A | * | 5/2000 | Ahern | 710/128 |
| 6,594,719 B1 | * | 7/2003 | Ahern et al. | 710/300 |
| 6,606,678 B1 | * | 8/2003 | Nakamura | 710/305 |

* cited by examiner

Primary Examiner—Abdelmoniem Elamin

(57) ABSTRACT

The input/output expansion system ("I/O expansion system") for an external or main computing unit includes a rack; at least one I/O expansion module mounted to the rack, the I/O expansion module comprising at least one I/O circuit card; a utilities control module mounted to the rack, the utilities control module being configured to receive a command from the external computer unit and generating a signal in response to the command for distribution to at least one I/O expansion module; and expansion power chassis mounted to the rack, the an expansion power chassis being electrically connected to a power source and being configured to distribute the power to the at least one I/O expansion module and the utilities control module.

19 Claims, 8 Drawing Sheets

MODULAR INPUT/OUTPUT EXPANSION SYSTEM FOR AN EXTERNAL COMPUTER

BACKGROUND OF THE INVENTION

This invention relates generally to input/output circuit cards for computer systems, and more particularly to a stand-alone system for providing additional input/output circuit card capacity and controller support for a computer system.

In a typical computer system rack having a system processor unit and related circuitry, input/output capacity is quite limited. The desire to house various computer components and peripheral devices within the system rack typically results in a small amount of physical space available for adding I/O peripheral component interconnect (PCI) cards. This lack of I/O capacity inhibits the ability to increase the functionality of the system. Further, the space dedicated to I/O cards in a typical computer rack cannot be used for other equipment such as peripheral devices, reducing the utility of the system. Increasing the size of the computer rack to accommodate additional I/O capacity is cumbersome and the computer components become difficult to access and manage.

To solve this problem, additional computer racks have been equipped with added I/O capacity and interfaced with the main computer system. However, because the I/O components require the resources of the main computing system to provide utilities such as power management, performance monitoring, and operation controls, this solution depletes the resources necessary to run the main computing system. Further, no mechanism has been proposed for easily and conveniently installing and removing a PCI chassis from a computer rack.

Thus, what is desired is a modular expansion system for an external computer unit providing additional input/output capability that can be added as dictated by the system and user requirements. Individual modules of the system may be designed and re-designed independently of each other as needed, allowing parallelism in design and verification efforts.

SUMMARY OF THE INVENTION

It is an object of the present invention to provide expansion of the I/O capacity and controller support for a computer system. It is a further object of the present invention to mitigate the electromagnetic interference (EMI) and facilitation of electromagnetic compatibility (EMC) in the expanded I/O system while accommodating high power density, high signal cable bandwidth, interconnection of multiple modules, and user and service access to interiors of modules and to individual cables. It is yet a further object of the present invention to provide an I/O expansion system that is easy to use and efficient in operation.

The present invention meets these objects by providing an input/output expansion system ("I/O expansion system") for an external or main computing unit, such as a server having a system processor unit (SPU). The I/O expansion system comprises a rack; at least one I/O expansion module having at least one I/O circuit card; a utilities control module mounted to the rack, the utilities control module being configured to receive a command from the external computer unit and generating a signal in response to the command for distribution to at least one I/O expansion module; and an expansion power chassis mounted to the rack, the expansion power chassis being electrically connected to a power source and being configured to distribute the power to the at least one I/O expansion module and the utilities control module.

Other advantages and components of the present invention will become apparent from the following description taken in conjunction with the accompanying drawings, which constitute a part of this specification and wherein are set forth exemplary embodiments of the present invention to illustrate various objects and features thereof.

DETAILED DESCRIPTION OF THE INVENTION

Figure 1:
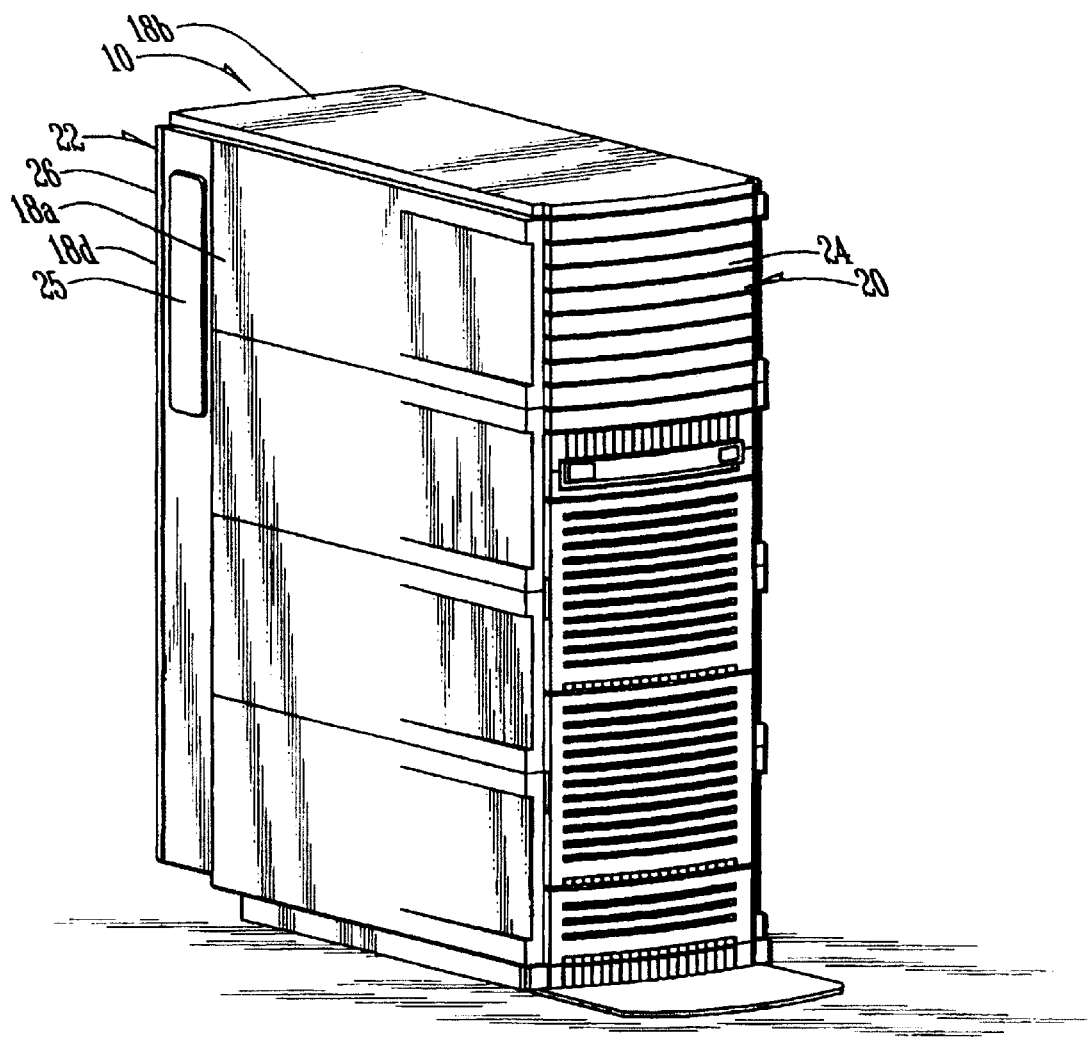
FIG. 1 is a perspective view showing an I/O expansion system of the present invention.

The stand-alone input/output expansion system (hereinafter "the I/O expansion system") of the present invention is shown generally at 10 in FIG. 1. The I/O expansion system 10 comprises an expansion power chassis 12 having a pair of power modules 13, a utilities control module 14, at least one input/output module (I/O module) 16, and a frame, indicated generally at 18, for holding the modules. The frame of the I/O expansion system is formed of a standard 19" computer equipment rack having four walls, 18a, 18b, 18c, and 18d, fixedly mounted thereto, and front and rear access openings 20, 22, respectively. It is to be understood that a different sized rack and I/O modules may be used as the system dictates without departing from the invention.

Figure 2:
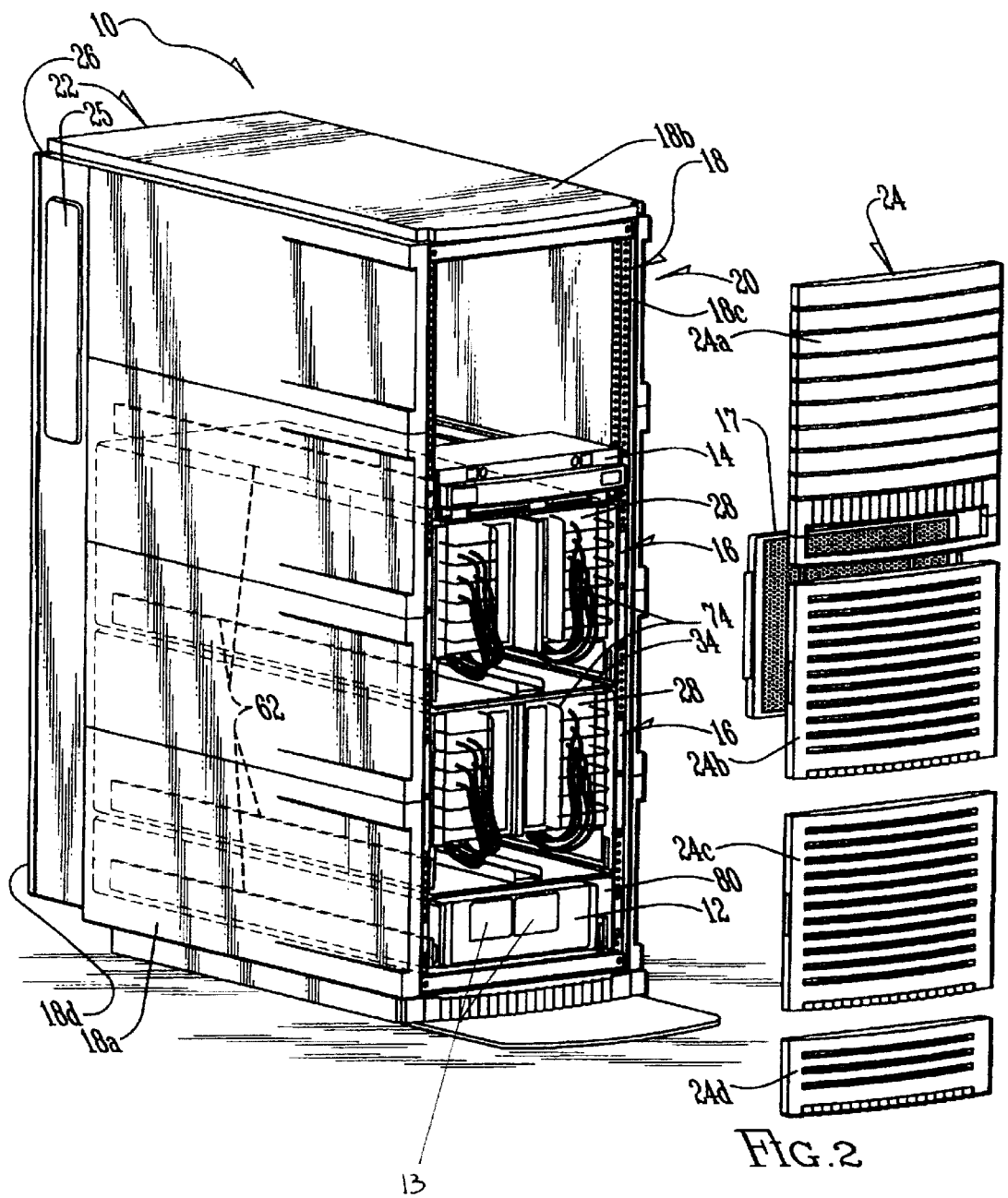
FIG. 2 is a perspective view showing the front bezels for the modules of the present invention and cover panels for the expansion rack separated from the I/O expansion system.

As shown in FIG. 2, the I/O expansion system 10 comprises at least one, and depending upon the external computer system needs up to three I/O modules 16. Further, each I/O module comprises at least one, and preferably two PCI card chassis 28, at least one fan module 31 (shown in FIG. 5) for each PCI card chassis, and a backplane 32 for each PCI card chassis (shown in FIG. 5) for interconnecting each PCI card chassis with the other modules and the main computer. The I/O module further includes a housing 34 to hold these components. The housing is mounted to the rack 18 of the I/O expansion system and comprises a generally rectangular box-shaped frame 35 having a front opening 36, a rear opening (not shown) and an extensible tray 40 mounted to the frame for receiving the PCI card chassis 28. Additionally, each I/O module 16 includes a plastic bezel to cover the front opening and an EMI shield 17 mounted adjacent the front opening to attenuate electromagnetic energy radiating from the I/O module 16. The EMI cover is releasably and securably mounted to the chassis and includes apertures to provide for an airflow path for the fan assembly mounted within the chassis.

The extensible tray 40 includes a generally horizontal upper shelf 42 and an alignment wall 44 extending vertically upwardly from the upper shelf. The alignment wall 44 defines two PCI card chassis partitions 46a, 46b on the upper shelf for receiving each of the PCI card chassis 28 and orienting the PCI card chassis on each shelf partition. The tray 40 further comprises a lower cable supporting shelf 48 extending substantially parallel to and spaced vertically from the upper shelf 42 to define a trough 50 therebetween. The trough 50 provides space for the cabling connecting the I/O module to the main computer and the peripheral components, and further includes a divider 52 extending longitudinally along the lower shelf to separate the trough into two separate bays 54a, 54b corresponding to the two PCI partitions 46a, 46b. Further, a pair of vertical walls 56 extend longitudinally between the upper and lower shelves at the sides of the trays. The divider 52 is preferably equipped with a cable pull-through hook (not shown) to facilitate the routing of the cables.

Figure 5:
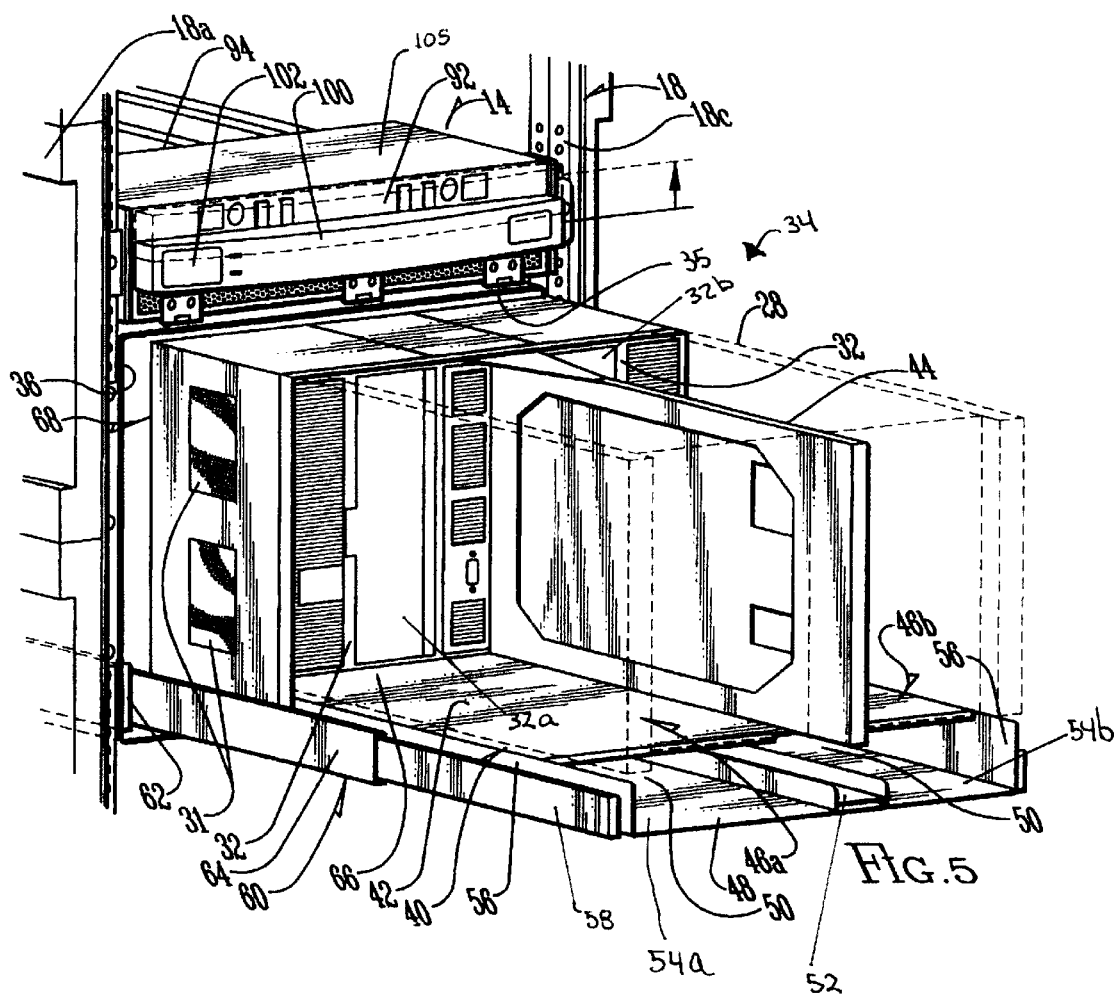
FIG. 5 is a partial perspective view of the I/O expansion module with the PCI card chassis removed therefrom to show the fan module and backplane assembly thereof.

To provide on-line addition, replacement or deletion access to the PCI circuit cards and hot-swap access for the I/O fan modules 31, the tray assembly comprising both the upper and lower tray is slidably extensible from the rack of the system. As seen in FIG. 5, each vertical wall has a rail 58 mounted thereto for slidable receipt in a telescoping member 60 mounted to the I/O module housing 34 for extension of the tray assembly out of the housing. The telescoping member 60 includes a base member 62 that is mounted to the I/O module housing, and an intermediate slide 64 that is mateably received by the base member and further receives the rail 58 of the tray assembly and the base member. The intermediate slide 64 provides a greater extension length for the tray assembly 40 to enable the entire tray assembly 40 to clear the I/O module housing 34 to permit access to the PCI chassis and a rear enclosure of the I/O module 16.

Preferably, the I/O module 16 comprises two fan modules 31 for each PCI card chassis to provide cooling for the PCI chassis. The fan modules are removably mounted in the rear enclosure 68 adjacent the rear end 66 of the tray assembly. The fan modules are hot-swappable and redundant such that an inoperative fan will not impede proper cooling of the I/O module and PCI card chassis and include an LED status indicator to display whether the particular module is operating. The fan modules 31 draw air through the I/O module from the front opening 36 of the I/O module housing and the PCI chassis card chassis 28 and exhausts the air out of the rear opening. To access a fan module, the tray 40 is extended out of the rack to expose the rear enclosure 68, and each fan module is individually removable from the side of the enclosure 68. Each fan module includes an EMI gasket between the module and enclosure 68. The rear enclosure 68 is removable from the I/O module housing 34 to access the I/O module backplane and cabling.

As shown in FIG. 5, a backplane 32 is provided for each PCI card chassis of the I/O module 16 and the backplane is mounted in front of the fan assembly. Each backplane 32 is configured to provide a utilities control input and a power supply input for the PCI card chassis 28 and includes connectors (not shown) on a rear wall of the backplane that provide interconnection with the data-link cable connector to facilitate connection of the I/O module to the main computing unit, a clock cable connector to interface the I/O module with the utilities control module, and a power supply cable to receive power from the expansion power chassis. Preferably, rear enclosure 68 includes a replaceable power input enclosure. The enclosure is removably mounted to an internal EMI barrier wall. A DC input is connected to the power input enclosure through feeding line filters. The DC power is filtered inside the input enclosure and then attached to connectors on the EMI barrier wall. The power input enclosure is thus field replaceable.

The two backplanes for the I/O expansion module are interconnected through a bridge cable that carries a signal from the utilities control module to each PCI card chassis. The backplanes are interconnected such that the signal is initially received in a first backplane (for example, backplane 32a) and then carried across the bridge cable to the second backplane (32b). Preferably, in order to insure that no misconnections occur, a mechanical cover (not shown) is placed on the second backplane output connector and distinct connectors are used for the input and output connections for each backplane, which prevents reversing of the connections. Reversing the connection of the backplane would alter the chassis numbering and adversely impact the controller support feature of the system 10.

In the illustrated embodiment, the I/O module 16 includes two PCI card chassis 28 that are received on the I/O module. Each PCI card chassis includes at least one and up to twelve PCI card slots for receiving PCI circuit cards (not shown), a PCI backplane (not shown), a connector for interconnecting the PCI backplane with the I/O backplane, a PCI power board, which supplies power to the PCI backplane and a housing 72. The power board for each PCI chassis further includes a DC to DC converter to convert the 48 V DC power to the required voltage for the PCI card chassis. The housing provides an EMC domain for the PCI card chassis and includes a removable side cover 37 for insertion, addition, deletion and replacement of PCI cards in the PCI slots of the chassis. The connector for interconnecting each PCI chassis to the I/O backplane is mounted to the exterior of the PCI chassis such that it is mateably received by a corresponding connector of the I/O module backplane. System commands and data are thus sent from the main computing unit to the I/O module backplane and communicated to the PCI backplane and attached I/O cards. The PCI chassis further includes a cable organizer 74 mounted to the exterior of the PCI chassis to manage the cables connected to each of the PCI card slots and provide strain relief therefor. The organizer 74 comprises a series of metal rods forming a rectangular grid pattern spaced away from the PCI card chassis front surface and provides vertical support for each cable adjacent the end connectors to reduce the tendency of the connectors to disengage from the card connectors of the PCI card chassis 28.

In an embodiment of the I/O expansion system 10 where the external computer system's needs dictate that only one PCI card chassis is required, a metal air blocker and EMI cover (not shown) is placed in the empty partition abutting the fan module and backplane. The air blocker prevents the flow of air through the empty partition and thus forces the air through the PCI card chassis and prevents electromagnetic radiation to the open, unused partition of the tray.

The PCI chassis cables transport data to and from the I/O cards in the PCI chassis and to peripheral devices located either in the I/O expansion system or to a location remote from the rack. The cables are routed through the trough 50 underneath the docking station 40 and lie on the cable supporting tray 48. A cable management arm (not shown) is mounted adjacent the rear opening of the I/O module housing 34 to manage the position of cables extending from a rear wall of the PCI card chassis. As the tray assembly 40 for each I/O module is extended, the management arm rotates downward to a flattened position to allow the cables to fully extend and maintain connection with the main computer unit. Alternatively, when the tray assembly is retracted within the I/O module housing, the management arm rotates upwardly to a vertical position to accommodate the slack for the data transmission cables such that they do not interfere with the movement of the tray assembly.

Electromagnetic compatibility for the I/O module is obtained by providing multiple EMC domains within each I/O module. The PCI card chassis 28 form a first EMC domain when the PCI card chassis backplane is connected to the ICE chassis backplane. A separate EMC domain is defined by rear enclosure 68 that contains the backplane, power cabling, data link cabling and the fan modules. Further, the I/O module housing 34 defining a five-sided enclosure surrounding both the PCI card chassis EMC domain and rear enclosure EMC domain provides an overall EMC boundary through the reflective surfaces or image planes.

Figure 3:
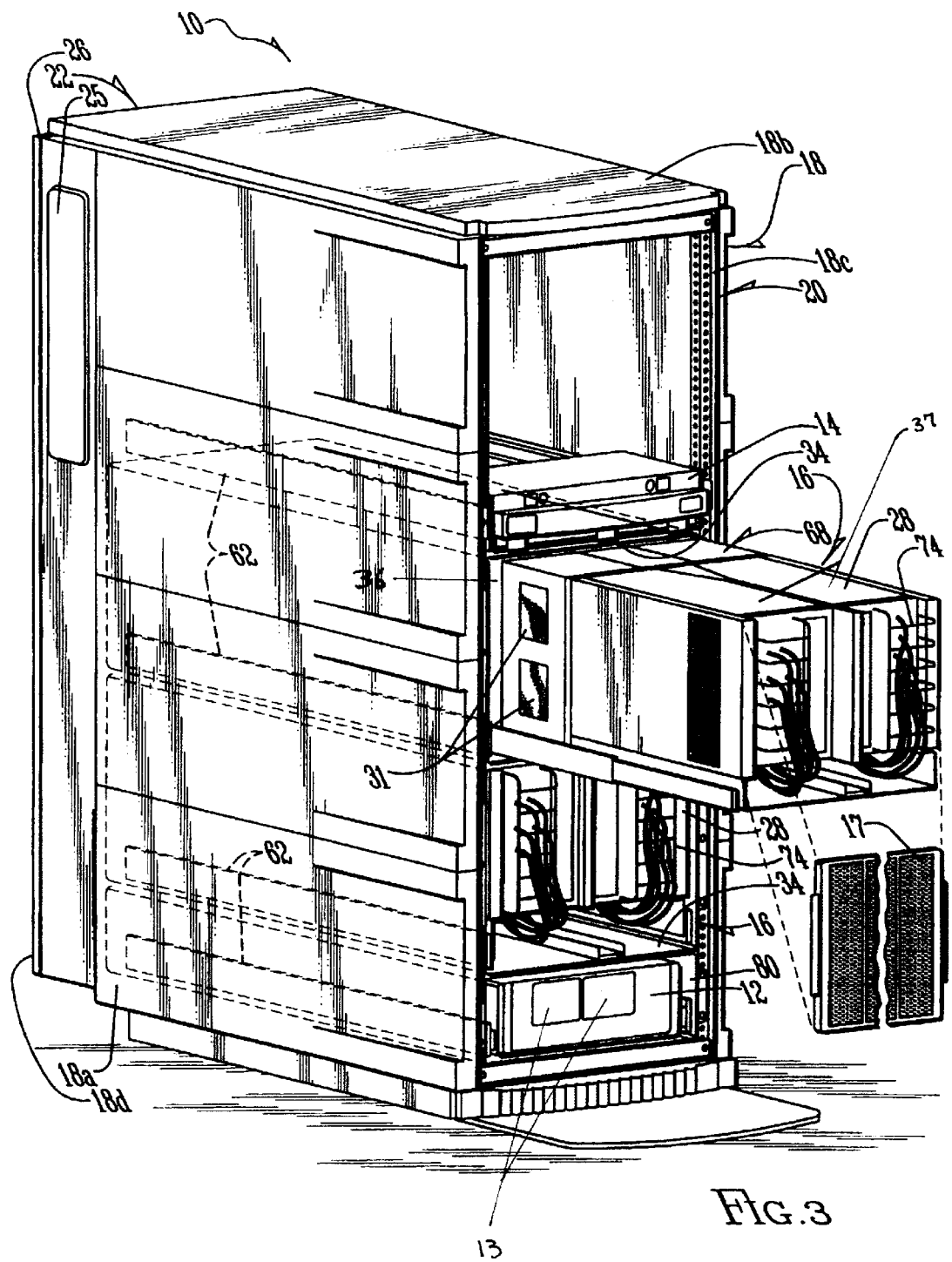
FIG. 3 is a perspective view showing a I/O expansion module in an extended position.

The I/O expansion system further includes an expansion power chassis 12 to provide DC power to the other modules of the system. As shown in FIG. 3, the expansion power chassis 12 is a generally rectangular box-shaped sheet-metal chassis 80 configured to mount to the rack 18 of the I/O expansion system 10. The expansion power chassis 12 includes two bulk power supply power modules 13 having circuitry for performing AC to DC power conversion. The chassis has a front wall 82 accessible by removing the plastic bezel of the I/O expansion system, and a rear wall accessible by a door of the I/O expansion system. Each power module is removably mounted to the front wall 82 of the expansion power chassis such that the power modules 13 of the expansion power chassis are redundant and hot swappable.

Figure 4:
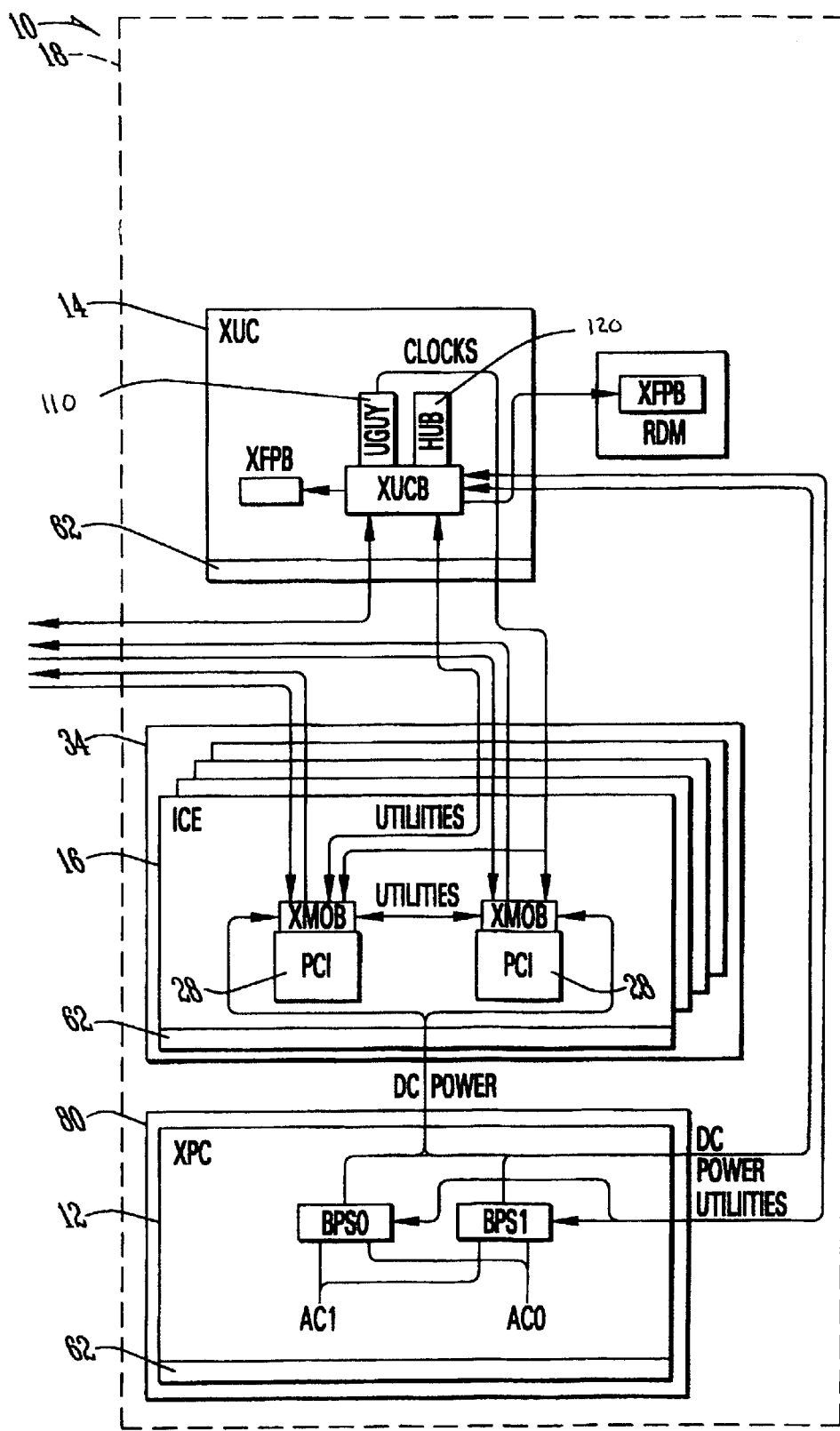
FIG. 4 is a schematic diagram of the modules of the present invention.

Each power module 13 ("BPS" in FIG. 4) receives input power from at least one and preferably two redundant 240V. single phase alternating current (AC) input power sources. Only one AC input is required for system operation and, if two input sources are provided for redundant AC connection, the loads are shared between the two AC sources. AC line breakers are further included in the expansion power module 12 for each AC input source. Each power module of the expansion power chassis 12 converts the input AC power to 5 V (low activity mode) and 48 V (operational mode) direct current (DC) power through circuitry and distributes this DC power through output connectors to the I/O expansion system modules. The low-activity mode is continuously supplied by the power modules. The operational mode is selectively activated by the utilities control module as the system needs dictate. The AC input and DC outputs of each module are filtered to prevent noise generated within the power module from emanating out of the module. The control line from the utilities control module likewise is filtered to prevent noise from entering the expansion power chassis of the system. Each DC output connector of the power expansion chassis further includes standard fuses to interrupt power to a supplied module upon determining an overload.

In the preferred embodiment, both the AC input connectors and the DC output connectors are positioned along a rear wall of the expansion power chassis. The rear wall of the module is formed with apertures to assist in heat dissipation for the expansion power chassis. Additionally, a utilities control module input is positioned on the rear surface to receive monitoring signals from the utilities control module.

The utilities control module 14 ("XUC" in FIG. 4) of the I/O expansion system provides system management functionality and serves as a gatekeeper between the main computing unit and the system modules. The utilities control module 14 receives commands over a high-speed utilities link from the main computing unit, interprets these signals and forwards them onto the modules of the I/O expansion system. Additionally, the utilities control module provides power control and monitoring, fan module monitoring, clock generations and receives internal and external environmental and scan test data from the I/O expansion and the power control modules 13. The utilities control module 14 interprets the utilities data and communicates the utilities status to the main computing unit through the utilities link.

Figure 6:
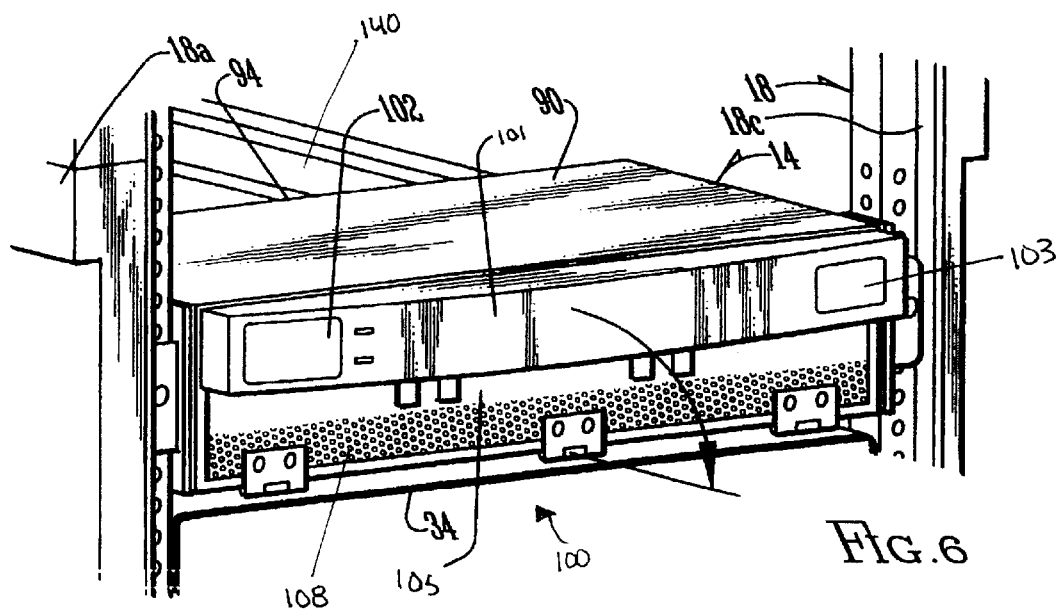
FIG. 6 is a partial perspective view of the utilities control module of the present invention showing a front panel display.

As shown in FIG. 6, the utilities control module 14 is housed in a sheet-metal chassis 90 that is mounted in the I/O expansion system rack 18. The housing 90 includes apertures on a side wall to allow cooling air to exhaust from the housing. The utilities control module 14 includes a utilities control and clock generation printed circuit assembly 110 ("UGUY" in FIG. 4), a hub printed circuit assembly 120 ("HUB" in FIG. 4), and a backplane printed circuit assembly ("XUCB" in FIG. 4) mounted to an interior surface of the rear wall of the utilities control module. Cabling interfaces the utilities control module with other modules of the I/O expansion system.

The housing for the utilities control module further includes a removable access panel 92 that extends from the side wall to the top cover of the chassis to form a generally L-shaped thin panel. The access panel has EMI gaskets to secure the panel to the chassis and to reduce the electromagnetic interference. Removal of the panel exposes the interior of the utilities control module, the clock cables and the utilities link.

Figure 7:
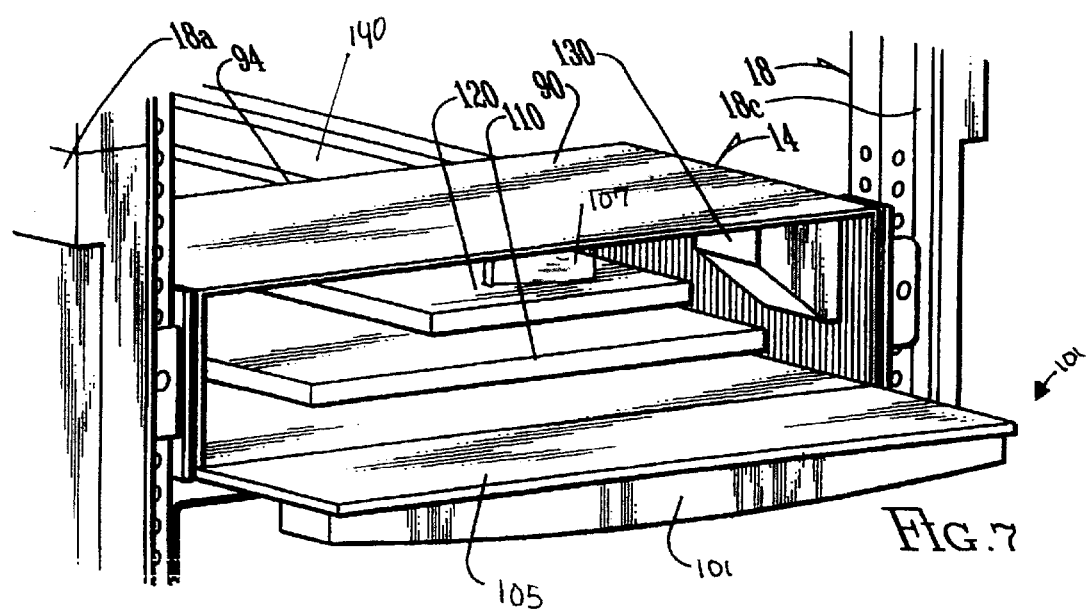
FIG. 7 is a partial perspective view of the utilities control module of the present invention showing a front panel display in an open position.

As shown in FIGS. 6 and 7, the utilities control module further includes control panel assembly 100 having display, control and environmental sense electronics. The utilities control panel assembly 100 includes a control panel 101 movably mounted to a door 105. The control panel 101 comprises a front panel board 102 ("XFPB" in FIG. 4) and a power on/off assembly 103. Front panel board 102 provides a cabinet number display and LED status indicators for both the low-activity 5 V power mode and the operational 48 V power mode. Front panel board 102 further includes a temperature sensor (not shown) mounted on a rear surface of the front panel board 102 to measure the ambient air temperature. An interface connector is provided to electrically connect the front panel board 102 with the utilities control module 14. The control panel is further provided with slits to allow the ambient air to flow to the sensor and to allow air to be drawn in for cooling the module. The door 105 of the control panel assembly is hingedly mounted to the housing 90 of the utilities module.

The control panel 101 of the assembly is movable to a raised position such that the door 105 may be pivoted downwardly. Control panel 101 must be raised before pivoting in order for the panel 101 to clear the bezel for the module mounted immediately below the utilities control module (e.g., the I/O expansion module for the system configuration shown in the Figures). The control panel assembly is releasably secured to housing 90 in a closed position by compression latches (not shown) and further by magnetic catch 107.

Opening door 105 of the panel assembly 100 provides access to the utilities control and clock generation PCA 110 (UGUY) and the computer hub PCA 120. The utilities control and clock generation PCA 110 of the utilities control module 14 generates high-frequency clock signals needed by the I/O expansion modules 16. Both the utilities control and clock generation PCA 110 and the hub boards 120 are horizontally mounted along their side edges by card guides that ensure the boards slide into and out of the utilities control module housing in proper position. The UGUY card 110 comprises a clock section, cabinet level utilities and a power monitor. The clock section generates various clocks and controls their margining. The cabinet level utilities section fans out the clocks to the I/O expansion module and manages the JTAG scan and reset to the I/O expansion system 10. The power monitor section of the UGUY card 110 monitors and controls power, temperature and the I/O expansion module configuration. The HUB card 120 accepts input from the main computer and provides a command path between the utilities in the main computer and the utilities in the UGUY card 110 and PCI chassis 28.

A hot-swappable fan module 130 having dual fans therein is mounted along an interior side wall of the utilities control module housing. Since it is undesirable to include an active component on the module backplane, the fan module 130 includes a circuit board that converts the low-activity mode DC power to 12 V DC power for the module. The fan module 130 draws air in through the slits of control panel 101 and grates 108 of the door 105 of the assembly 100 to cool the interior components and exhausts heated air though a grate provided in the side wall of housing 90.

Preferably the utilities control module further includes a rear display module ("RDM" in FIG. 4) mounted to the rack adjacent to the rear opening of the I/O expansion system. The rear display module includes a rear panel board that displays the cabinet number and the LED status indicators for the low activity and operational power supplies. The rear display module is coordinated with the display on the front panel to show the cabinet number associated with the particular I/O expansion system rack. The rear display module is mounted generally behind the rear wall of the utilities control module. The location of the rear display module is not fixed, and may be located anywhere on the I/O expansion system that is convenient for the user.

Figure 8:
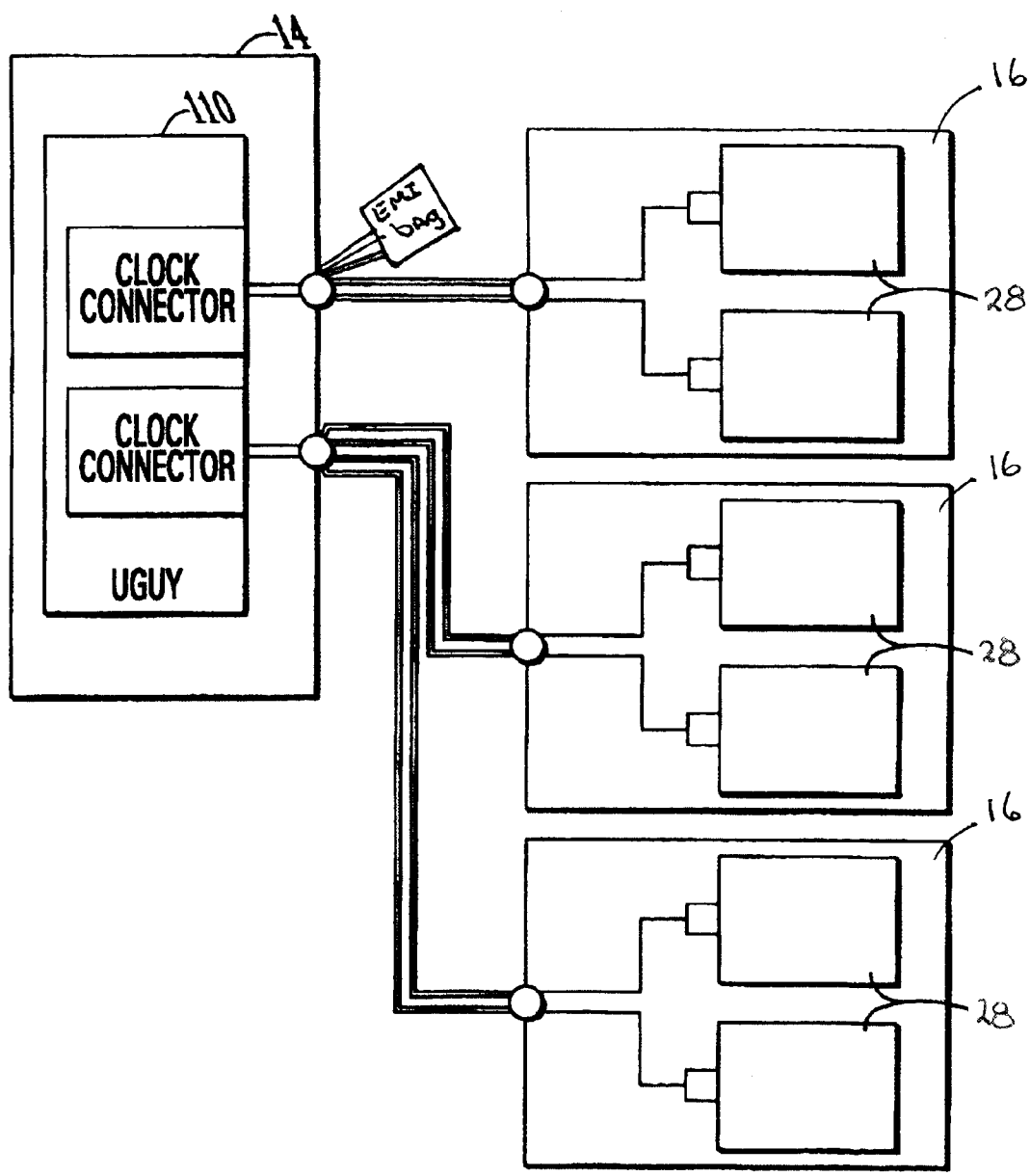
FIG. 8 is a topology of the clock signals from the clock generation circuit assembly.
Figure 9:
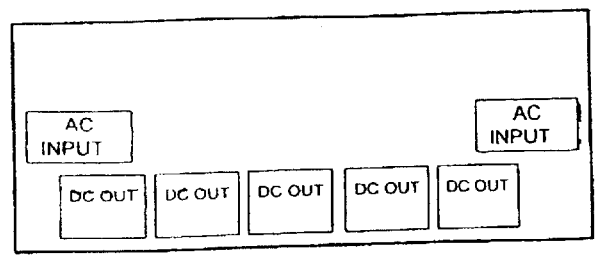
FIG. 9 is a schematic of the rear of the expansion power chassis.
Figure 10:
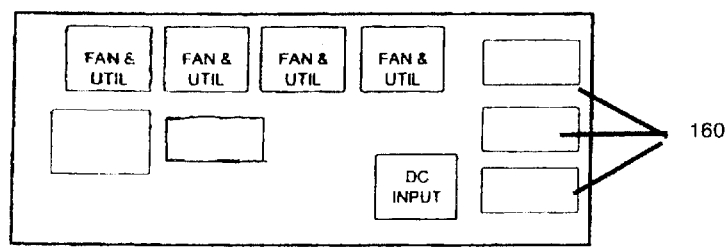
FIG. 10 is a schematic of the rear of the utilities control module of the present invention.
Figure 11:
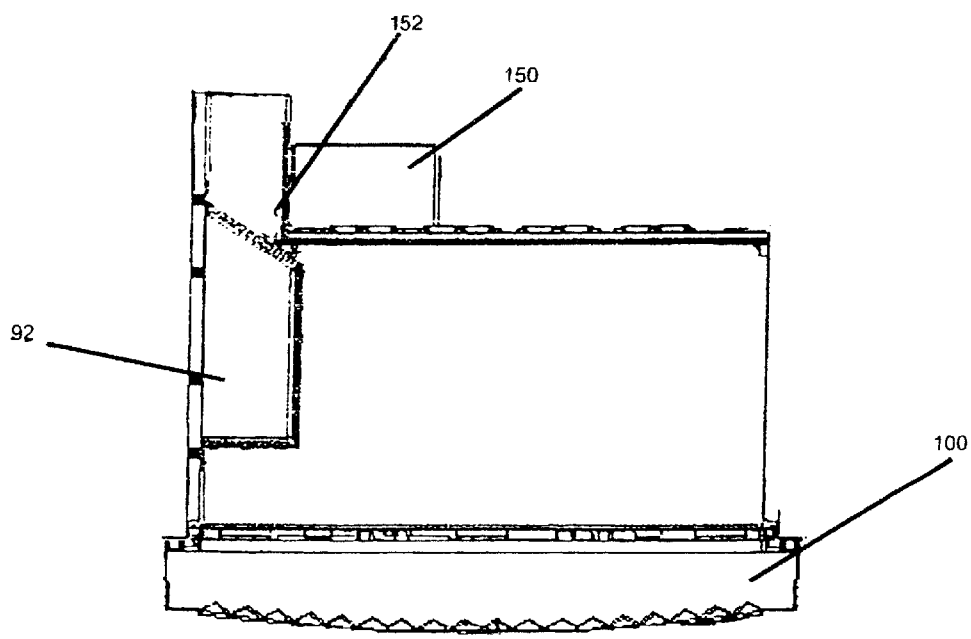
FIG. 11 is a top plan view of the utilities control module.

The utilities control module housing provides multiple connectors for interfacing the utilities control module with the other modules of the I/O expansion system. The housing 90 includes a power input enclosure 150, which has an EMI containment barrier 152 internal of the outer surface of the input enclosure. The DC power is connected to a connector at the input enclosure. The DC power is filtered in the power input enclosure through feeding line filters. A rear portion of the housing 90 is further configured to receive up to two clock cables at openings 160 that mate with connectors on the utilities control and clock generation card 110 and a utilities link that mates with the backplane. As shown in FIG. 8, each connector on the card 110 supplies four clock signals and each clock cable serves two I/O modules 16. As a result, the clock cable splits into a wye outside of the utilities control module with each branch serving one I/O module. Similarly, at the I/O module 16, the clock cable connects with the I/O module chassis and splits again into a wye of two sub-cables inside the I/O module with one branch serving each PCI card chassis 28.

In an I/O expansion system having two I/O modules 16, the unused opening for the clock cable is covered with EMI blanks, such as a ferrule blank. A housing unit contiguous with housing 90 of the utilities control module is configured to receive the clock cable shield termination for the clock cables and the high speed utilities link. Further, if an odd number of I/O modules are used in the I/O expansion system, the unused end of the clock cable is placed in a foil-lined bag to prevent the clock cable from radiating EMI to other components of the system.

The utilities control module further includes a backplane ("XUCB" of FIG. 4) mounted to the interior side of the utilities control module rear wall such that the connectors extend though the rear wall and are connected to the backplane. The backplane is preferably vertically mounted in perpendicular alignment with the utilities control and clock generation card 110 ("UGUY" in FIG. 4) and the computer hub card 120 and has two connectors for matingly receiving the utilities control and clock generation card and the hub card.

The backplane further includes a fan module connector to provide power to the fan module 130. The utilities link is received by the utilities control module backplane such that the utilities control module can process commands received from the main computing unit and transmit interpreted status data received from the various modules to the main computing unit. The backplane receives an input power from the expansion power chassis 12 to provide power for the front and rear display panel, the fan module 130, the UGUY 110, and the Hub card 120.

The utilities control module is provided with an extensible slide mount 140 for moving the utilities control module out of the I/O expansion system rack. The slide mount comprises a pair of horizontally extending telescoping rail members. The base member of the telescoping rail is mounted to the frame of the I/O expansion system rack above the supporting tray of the utilities control module and the extended member of the rail is mounted on the side wall of the utilities control module chassis. Thus, by pulling outward on the utilities control module chassis, the extended member will guide and vertically support the utilities control module out of the I/O expansion system rack such that the utilities control module can be easily accessed for maintenance or replacement.

The I/O expansion system 10 of the present invention thus provides additional capacity for I/O cards for the external computer unit. The system 10 accommodates up to 72 PCI slots in six 12-slot PCI card chassis 28. The modules of the system are designed to be installed independently in the rack and thus there are no rack constraints for the components with respect to the cooling, rack space consumption or component adjacency. Further, multiple I/O expansion systems 10 may be used to further increase the I/O capacity for the external computer unit.

It is to be understood that while certain forms of the present invention have been illustrated and described herein, it is not to be limited to the specific forms or arrangement of parts described and shown.

What is claimed is:

1. A stand-alone input/output (I/O) expansion system for an external computer unit, the system providing additional I/O circuit card capacity and controller support for the I/O circuit cards for the external computer unit, the system comprising:

a rack, at least one I/O expansion module mounted to the rack, the I/O expansion module comprising at least one I/O circuit card;

a utilities control module mounted to the rack, the utilities control module having a clock generation printed circuit assembly for generating a clock signal for the at least one circuit card; and a power control module mounted to the rack, the power control module being electrically connected to a power source and the power control module comprising circuitry to convert an alternating current power to direct current power, the power control module further being configured to distribute the power to the at least one I/O expansion module and the utilities control module.

2. The system of claim 1, wherein the at least one I/O expansion module further comprises a housing having an extensible tray for selectively sliding the tray from the rack in a substantially horizontal plane between an extended position and a retracted position, the at least one I/O circuit card being received on the tray.

3. The system of claim 2, wherein the at least one I/O expansion module further comprises at least one PCI card chassis for holding the at least one I/O circuit card, and a backplane for interfacing the at least one I/O expansion module with the utilities control module and the power control module, the at least one PCI card chassis being received on the extensible tray.

4. The system of claim 3, wherein the at least one I/O expansion module further comprises at least one fan module, the at least one fan module being mounted to the housing of the I/O expansion module to provide airflow through the PCI card chassis.

5. The system of claim 1, wherein the at least one I/O expansion module comprises two PCI card chassis, each PCI card chassis having at least one PCI circuit card, and wherein the at least one I/O expansion module further comprises two backplanes, one backplane interfacing with one PCI card chassis, and two fan modules, one fan module cooling one PCI card chassis.

6. The system of claim 5, wherein the at least one I/O expansion module comprises four fan modules, each fan module being removably mounted to a rear enclosure of the housing for the I/O expansion module.

7. The system of claim 5, wherein the two backplanes of the at least one I/O expansion module comprise a first backplane associated with a first PCI card chassis and a second backplane associated with a second PCI card chassis, the first and second backplanes being interconnected by a bridge cable, the bridge cable sequentially transmitting a signal received by the first backplane to the second backplane.

8. The system of claim 5, wherein each PCI card chassis of the two PCI card chassis further comprise an enclosure, the enclosure having a selectively releasable panel for accessing the at least one PCI circuit card of each PCI card chassis.

9. The system of claim 1, wherein the utilities control module comprises a front panel display and a rear panel display for indicating the status of the at least one I/O expansion module and the power control module.

10. The system of claim 9, wherein the utilities control module further comprises an enclosure having a pivotable control panel assembly to provide access to an interior of the utilities control module.

11. The system of claim 10, wherein the utilities control module further comprises:

a hub printed circuit assembly for providing a command path between the external computer and the clock generation printed circuit assembly; and a backplane mounted to an interior side of the utilities control module, the backplane having an inwardly-facing surface for connection to the clock generation printed circuit assembly and the hub printed circuit assembly.

12. The system of claim 11, wherein the I/O expansion module further comprises:

a clock signal input for receiving the clock signals from the utilities control module; and a power input for receiving input power from the power control module.

13. The system of claim 11, wherein the clock generation printed circuit assembly of the utilities control module further comprises a cabinet level utilities section for generating a utilities status signal, and wherein the I/O expansion module further comprises a utilities status input.

14. The system of claim 9, further comprising a rear display module mounted to the equipment rack and interfaced with the utilities control module, the rear display module being configured to provide a status of the system.

15. The system of claim 1, wherein the I/O expansion system further includes an expansion power chassis, the expansion power chassis comprising at least one power module.

16. The system of claim 14, wherein the power control module is operably configured to provide direct current power in an operational mode and a low-activity mode.

17. The system of claim 16, wherein the operational mode is 48 volts and wherein the low-activity mode is five volts.

18. A stand-alone input/output (I/O) expansion system for an external computer unit, the system providing additional I/O circuit card capacity and controller support for the I/O circuit cards for the external computer unit, the system comprising:

a rack, at least one I/O expansion module mounted to the rack, the I/O expansion module comprising at least one I/O circuit card and a housing having an extensible tray for selectively sliding the tray from the rack in a substantially horizontal plane between an extended position and a retracted position, the at least one I/O circuit card being received on the tray, the I/O expansion module further comprising a cable trough to facilitate passage of a series of cables connected to the at least one I/O expansion module to external of the I/O expansion system;

a utilities control module mounted to the rack, the utilities control module having a clock generation printed circuit assembly for generating a clock signal for the at least one circuit card; and a power control module mounted to the rack, the power control module being electrically connected to a power source and being configured to distribute the power to the at least one I/O expansion module and the utilities control module.

19. The system of claim 18, wherein the at least one I/O expansion module further comprises a telescoping apparatus mounted to the docking station, the telescoping apparatus having a base member mounted to the housing for the at least one I/O expansion module and an extended member mounted to the tray to slidably move the tray between the extended position and the retracted position.

* * * * *